United States Patent
Hieb et al.

(10) Patent No.: US 11,500,548 B2
(45) Date of Patent: Nov. 15, 2022

(54) MEMORY PHYSICAL PRESENCE SECURITY IDENTIFICATION

(71) Applicant: Micron Technology, Inc., Boise, ID (US)

(72) Inventors: Adam J. Hieb, Meridian, ID (US); Robert W. Strong, Folsom, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/192,358

(22) Filed: Mar. 4, 2021

(65) Prior Publication Data
US 2022/0283704 A1 Sep. 8, 2022

(51) Int. Cl.
*G06F 3/06* (2006.01)

(52) U.S. Cl.
CPC ............ *G06F 3/062* (2013.01); *G06F 3/0655* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; (Continued)

(56) References Cited

U.S. PATENT DOCUMENTS 8,112,625 B2   2/2012   Ginter et al.
9,552,684 B2   1/2017   Bacco et al.
(Continued)

FOREIGN PATENT DOCUMENTS

WO   WO-2016024967 A1 *   2/2016   ............. G06F 12/14

OTHER PUBLICATIONS

Trusted Computing Platform Alliance (TCPA) Main Specification Version 1.1b; Trusted Computing Group; Feb. 22, 2002; retrieved from https://trustedcomputinggroup.org/wp-content/uploads/TCPA_Main_TCG_Architecture_v1_1b.pdfon Mar. 17, 2022 (Year: 2002).*
(Continued)

*Primary Examiner* — Daniel C. Chappell
(74) *Attorney, Agent, or Firm* — Brooks, Cameron & Huebsch, PLLC

(57) ABSTRACT

A system includes a memory component and a processing device, operatively coupled with the memory component, to generate a physical presence security identification (PSID) for the memory component using a statistically random number generator. The processing device, operatively coupled with the memory component, can securely retrieve the PSID and revert the memory component to an original state using the PSID.

19 Claims, 5 Drawing Sheets

(58) Field of Classification Search

CPC ........ G06N 99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
27/00–3293; H01L 2225/00–1094; H03M
7/00–707; H04L 9/00–38; H04L
12/00–66; H04L 41/00–5096; H04L
49/00–9094; H04L 61/00–6095; H04L
67/00–42

See application file for complete search history.

(56) References Cited

U.S. PATENT DOCUMENTS

| | | | |
|---|---|---|---|
| 9,846,814 B1 | 12/2017 | Fraser | |
| 10,824,367 B2 * | 11/2020 | Wahla | G06F 21/552 |
| 10,929,308 B2 * | 2/2021 | Sandberg | G06F 3/0659 |
| 2003/0037181 A1 * | 2/2003 | Freed | H04L 67/1068 |
| | | | 709/202 |
| 2010/0031370 A1 * | 2/2010 | Ellison | G06F 21/575 |
| | | | 726/27 |
| 2018/0018627 A1 | 1/2018 | Ross et al. | |

OTHER PUBLICATIONS

J. T. Lo and D. Bassu, "Robust identification of uncertain dynamical systems where adaptation is impossible," Proceedings of the 2002 International Joint Conference on Neural Networks. IJCNN'02 (Cat. No. 02CH37290), 2002, pp. 1558-1563 vol. 2, doi: 10.1109/IJCNN.2002.1007749. (Year: 2002).*

M. Vellekoop and A. Bagchi, "Adaptive identification by stochastic approximation," Proceedings of 1995 34th IEEE Conference on Decision and Control, 1995, pp. 3865-3866 vol. 4, doi: 10.1109/CDC.1995.479202. (Year: 1995).*

A. Dharand S. Bhasin, "Multi-Model Indirect Adaptive MPC," 2020 59th IEEE Conference on Decision and Control (CDC), 2020, pp. 1460-1465, doi: 10.1109/CDC42340.2020.9304339. (Year: 2020).*

S. Nagarakatte, M. M. K. Martin and S. Zdancewic, "Watchdog: Hardware for safe and secure manual memory management and full memory safety," 2012 39th Annual International Symposium on Computer Architecture (ISCA), 2012, pp. 189-200, doi: 10.1109/ISCA.2012.6237017. (Year: 2012).*

* cited by examiner

| | DECIMAL | SYMBOL | DESCRIPTION | RANDOM NUMBER |
|---|---|---|---|---|
| ASCII CODE | 48 | 0 | (NUMBER ZERO) | N/A |
| ASCII CODE | 49 | 1 | (NUMBER ONE) | 1 |
| ASCII CODE | 50 | 2 | (NUMBER TWO) | 2 |
| ASCII CODE | 51 | 3 | (NUMBER THREE) | 3 |
| ASCII CODE | 52 | 4 | (NUMBER FOUR) | 4 |
| ASCII CODE | 53 | 5 | (NUMBER FIVE) | 5 |
| ASCII CODE | 54 | 6 | (NUMBER SIX) | 6 |
| ASCII CODE | 55 | 7 | (NUMBER SEVEN) | 7 |
| ASCII CODE | 56 | 8 | (NUMBER EIGHT) | 8 |
| ASCII CODE | 57 | 9 | (NUMBER NINE) | 9 |
| ASCII CODE | 65 | A | (CAPITAL A) | 10 |
| ASCII CODE | 66 | B | (CAPITAL B) | 11 |
| ASCII CODE | 67 | C | (CAPITAL C) | 12 |
| ASCII CODE | 68 | D | (CAPITAL D) | 13 |
| ASCII CODE | 69 | E | (CAPITAL E) | 14 |
| ASCII CODE | 70 | F | (CAPITAL F) | 15 |
| ASCII CODE | 71 | G | (CAPITAL G) | 16 |
| ASCII CODE | 72 | H | (CAPITAL H) | 17 |
| ASCII CODE | 73 | I | (CAPITAL I) | N/A |
| ASCII CODE | 74 | J | (CAPITAL J) | 18 |
| ASCII CODE | 75 | K | (CAPITAL K) | 19 |
| ASCII CODE | 76 | L | (CAPITAL L) | N/A |
| ASCII CODE | 77 | M | (CAPITAL M) | 20 |
| ASCII CODE | 78 | N | (CAPITAL N) | 21 |
| ASCII CODE | 79 | O | (CAPITAL O) | N/A |
| ASCII CODE | 80 | P | (CAPITAL P) | 22 |
| ASCII CODE | 81 | Q | (CAPITAL Q) | 23 |
| ASCII CODE | 82 | R | (CAPITAL R) | 24 |
| ASCII CODE | 83 | S | (CAPITAL S) | 25 |
| ASCII CODE | 84 | T | (CAPITAL T) | 26 |
| ASCII CODE | 85 | U | (CAPITAL U) | 27 |
| ASCII CODE | 86 | V | (CAPITAL V) | 28 |
| ASCII CODE | 87 | W | (CAPITAL W) | 29 |
| ASCII CODE | 88 | X | (CAPITAL X) | 30 |
| ASCII CODE | 89 | Y | (CAPITAL Y) | 31 |
| ASCII CODE | 90 | Z | (CAPITAL Z) | 32 |

*FIG. 3*

MEMORY PHYSICAL PRESENCE SECURITY IDENTIFICATION

TECHNICAL FIELD

Embodiments of the disclosure relate generally to memory sub-systems, and more specifically, relate to memory physical presence security identification (PSID).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 is an example of a lookup table for generating a memory physical presence security identification (PSID) in accordance with some embodiments of the present disclosure.

DETAILED DESCRIPTION

Aspects of the present disclosure are directed to memory physical presence security identification (PSID). A memory sub-system can be a storage system, storage device, a memory module, or a combination of such. An example of a memory sub-system is a storage system such as a solid-state drive (SSD). Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A PSID is a global recovery credential, that can be used to revert a memory device to its original state (e.g., its original factory state or its original security state). The PSID can be printed on a medium attached to the memory device. In a conventional memory sub-system, the PSID can be stored in a manufacturer's internal database in plain text and kept there after the PSID is printed on the medium attached to the memory device. Further, in some instances, the PSID follows a predictable pattern and can be derived from a serial number of the memory device. For instance, if the PSID was created using a low entropy algorithm, the PSID may be predictable or extrapolated using the device's serial number. For example, the serial numbers and PSID values can differ only by two numbers such that if one PSID algorithm is weak, then it may be possible to derive another device's PSID value given knowledge of only the serial number and the serial number and PSID of another device. These can present security risks, as they may allow an unauthorized user (e.g., hacker) to deduce the PSID and revert the memory device.

Aspects of the present disclosure address the above security risks and other deficiencies by using a statistically random number generator to generate the PSID value. Further, the PSID can be stored in a device manufacturer's secured controlled database, and erased from the database once the PSID value is printed on the medium attached to the memory device. Further, the PSID can be treated as a password and can be stored as a keyword that can generate a cryptographic key to store and encrypt the PSID value. Further, an authenticated command can provide for automatic validation of, and additional security for, the PSID value. For instance, the PSID can be used to revert the memory device to an original state (e.g., original factory state) only upon being validated.

Figure 1:
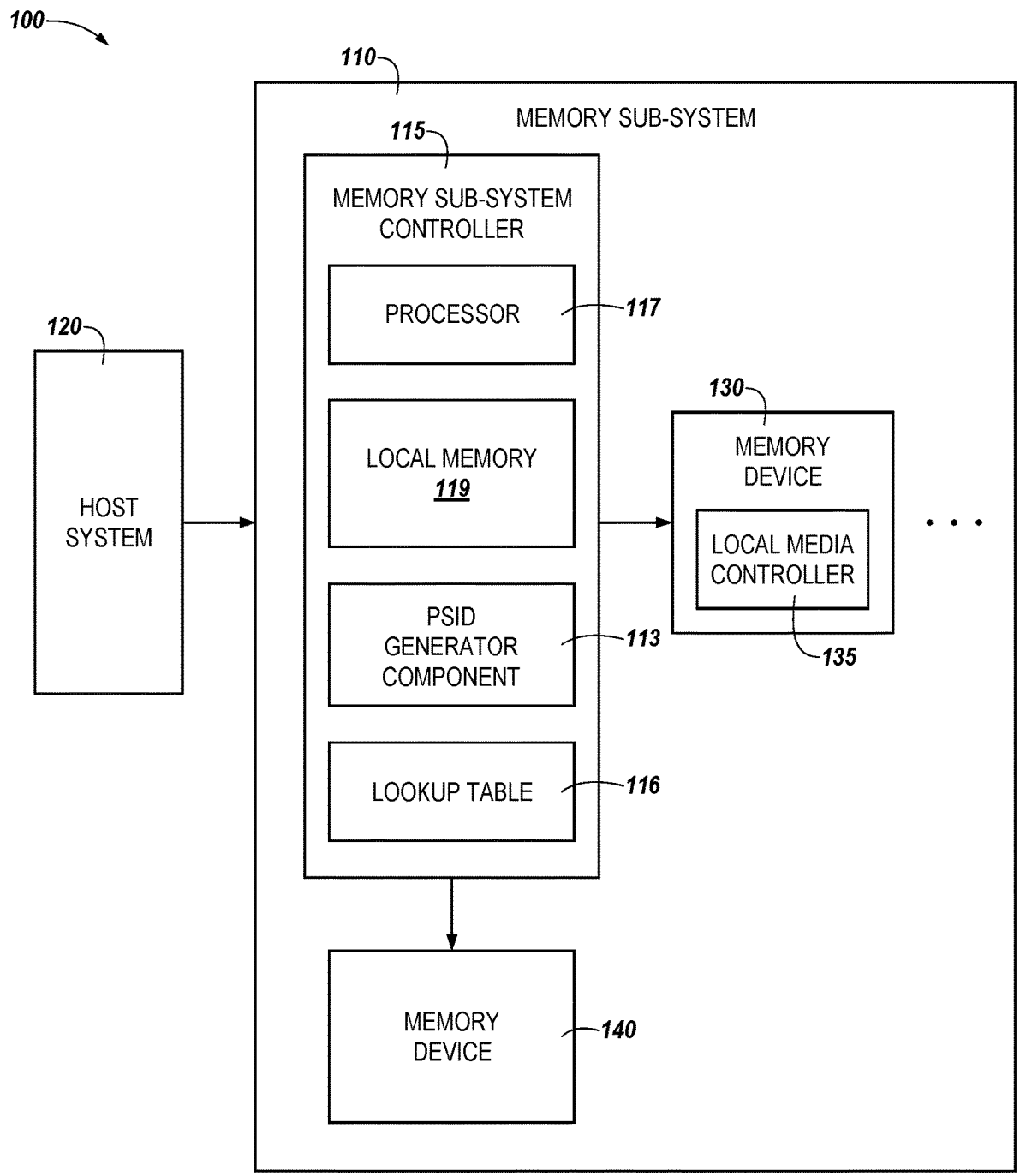
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs). The memory sub-system 110 can include one or more memory components that store data. The memory components can be, for example, non-volatile memory components and volatile memory components. In general, a host system can utilize a memory sub-system 110 to store data at the memory components and to retrieve data from the memory components.

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells. The memory cells can include single level cells (SLCs) that can store one bit per cell, multi-level cells (MLCs) that can store two bits per cell, (e.g., triple level cells (TLCs) that can store three bits per cell, quad-level cells (QLCs) that can store four bits per cell, and/or penta-level cells (PLCs) that can store five bits per cell, among others. As used herein, the term multiple level cells is used to refer to cells configured to store more than one bit per cell (e.g., MLC, TLC, QLC, PLC, etc.). In some embodiments, a particular memory component can include an SLC portion, and an MLC portion, a TLC portion, a QLC portion, and/or a PLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type memory (e.g., 2D NAND, 3D NAND) are described, the memory device 130 can be based on any other type of non-volatile memory or storage device, such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a PSID generator component 113. Although not shown in FIG. 1 so as to not obfuscate the drawings, the PSID generator component 113 can include various circuitry to facilitate generating a PSID value using a statistically random number generator. The PSID generator component 113 can further automatically validate the PSID value based on provision of an authenticated command. Once the PSID value is validated, the PSID generator component can revert the memory device 130 to an original state. As used herein, an original state can refer to the original factory state, and/or an original security setting installed by the manufacturer. For instance, reverting the memory device to its original state can include a global erase of the memory device, including the removal of any security settings (e.g., parameters) on the device. The PSID generator component 113 can include special purpose circuitry in the form of an ASIC, FPGA, state machine, and/or other logic circuitry that can allow the PSID generator component 113 to orchestrate and/or perform the operations described herein.

The memory sub-system 110 can also include a lookup table 116. Although not shown in FIG. 1 so as to not obfuscate the drawings, the lookup table 116 can include various circuitry to store values used to generate a statistically random number for the PSID. Although shown as a distinct component from the PSID generator component 113, in some embodiments, the lookup table 116 can be partially or entirely deployed within the PSID generator component 113. The lookup table 116 can include one or more storage locations that can store one or more data values. The data values can contain ASCII codes corresponding to random number values used to generate statistically random numbers for the PSID. The lookup table 116 can include special purpose circuitry in the form of an ASIC, FPGA, state machine, and/or other logic circuitry that can allow the lookup table 116 to orchestrate and/or perform the operations described herein.

In some embodiments, the memory sub-system controller 115 includes at least a portion of the PSID generator component 113 and the lookup table 116. For example, the memory sub-system controller 115 can include a processor 117 (processing device) configured to execute instructions stored in local memory 119 for performing the operations described herein. In some embodiments, the PSID generator component 113 and the lookup table 116 are part of the host system 120, an application, or an operating system.

As an example, PSID generator component 113 can generate a PSID for the memory device 130 using a statistically random number generator. For instance, PSID generator component 113 can generate the PSID using the statistically random number generator with lookup (e.g., mapping) table 116 (e.g., values stored in lookup table 116), as will be further described herein (e.g., in connection with FIG. 3). By generating the PSID in such a manner, PSID generator component 113 can ensure that the PSID can not be derived from the serial number of memory device 130. This PSID can subsequently be used by controller 115 to revert the memory device to its original state, without the PSID being transmitted on the physical host interface of host system 110. In one embodiment, the statistically random number generator can be a Deterministic Random Bit Generator (DRBG). In another embodiment, the statistically random number generator can be a Globally Unique Identifier (GUID) generator.

The PSID can be stored as a product security parameter in a secure storage format (e.g., not a plain-text format) on memory device 130. For example, in one embodiment, the PSID can be stored in a secure storage format in the memory device 130 using encryption. In another embodiment, the PSID can be stored in a secure storage format in the memory device 130 using cryptographic hash or cryptographic key. As an additional example, the PSID can be stored on a secure database. For instance, the PSID can be stored as a keyword compressed and embedded on the secure database. An example of the secure database will be further described herein (e.g., in connection with FIG. 2).

The PSID can be recovered from the memory device 130 or the secure database and transmitted to an external device for printing on a medium attached to (e.g., a label to be physically placed on, or an engraving, or any other appropriate means of attachment) the memory sub-system 110. For example, the PSID can be securely recovered (e.g., retrieved) from memory device 130 upon the memory sub-system 110 receiving (e.g., from host system 110) an authenticated command, and then transmitted to be printed on the medium attached to the memory device 130. Further, the PSID can only be recovered when a drive of the memory device 130 is unlocked using the authenticated command. As an additional example, the PSID can be recovered from the secure database using a restricted command.

After being printed on the medium attached to the memory device 130, the PSID can be deleted from the secure database and the medium can be attached to the memory device 130. The PSID can be deleted from the secure database by erasing the PSID from all storage locations within the secure database. The medium attached to the memory device 130 can be an encrypted manufacturing data image and the PSID can be securely retrieved from the manufacturing data image, and an authenticated command can be used to enable access to the PSID. Once the PSID is accessed and securely retrieved, it can be used to revert memory device 130 to its original state (e.g., revert the security settings on the memory device 130 back to the default security settings).

Figure 2:
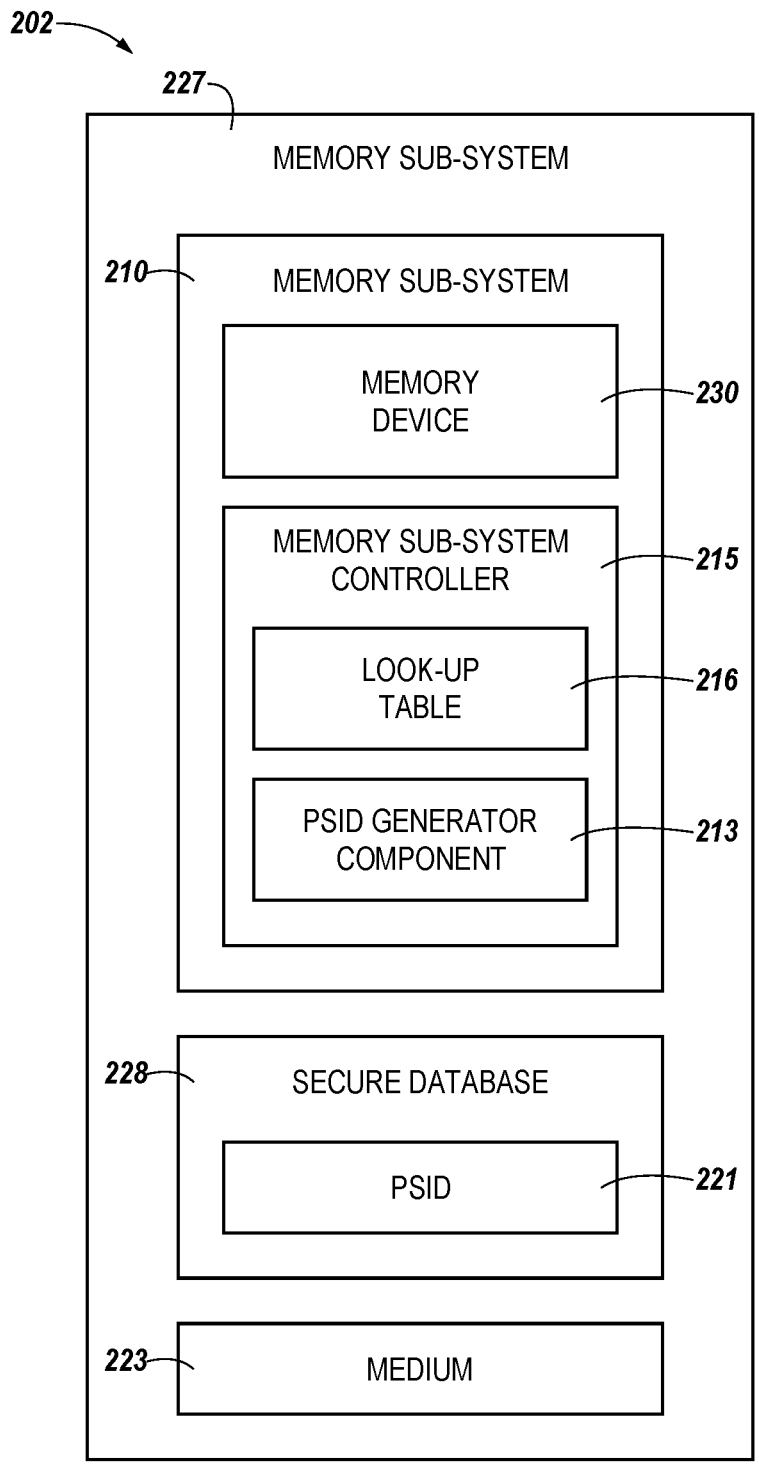
FIG. 2 illustrates an example computing system that includes a memory sub-system in accordance with some embodiments of the present disclosure.

FIG. 2 illustrates an example computing system 227 that includes a memory sub-system 210 in accordance with some embodiments of the present disclosure. As shown in FIG. 2, the computing system 227 can include a memory sub-system 210 which can be analogous to memory sub-system 110 illustrated in FIG. 1. The computing system 227 (e.g., memory sub-system 210) can include a memory device 230, which can be analogous to memory device 130 of FIG. 1. The computing system 227 (e.g., memory sub-system 210) can include a memory sub-system controller 215, which can be analogous to memory sub-system controller 115 of FIG. 1.

The computing system 227 can include a secure database 228 and a medium 223 attached to the memory device 230. The memory sub-system controller 215 can include a look-up table 216 and a PSID generator component 213, which can be analogous to look-up table 116 and PSID generator component 116 and 113, respectively, of FIG. 1. The secure database 228 can include a PSID 221 and can be, for example, an SQLite database.

The PSID generator component 213 can automatically verify the PSID 221 stored within secure database 228, based on provision of an authenticated command. The memory sub-system 210 can also include a lookup table 216. The lookup table 216 can include one or more storage locations that can store one or more data values. The data values can represent ASCII codes corresponding to random number values used to generate statistically random numbers for the PSID 221.

The PSID 221 can be generated securely such that it cannot be derived from a serial number of memory device. Once generated, the PSID 221 can be stored as a keyword, compressed and embedded on secure database 228. In one embodiment, the PSID 221 can be stored in a secure storage format in the memory device 230 using encryption. In another embodiment, the PSID 221 can be stored in a secure storage format in the memory device 230 using a cryptographic hash or cryptographic key.

The PSID can be recovered from the memory device 230 or the secure database 228 upon receipt of an authenticated command. The authenticated command can include, for instance, a visual studio command. The authenticated command can be inputted to enable access to the PSID. The authenticated command can provide for automatic validation of the PSID (e.g., such that a manual reading of the PSID can be avoided). Once validated, the PSID can be securely recovered (e.g., retrieved). The PSID can only be recovered when a drive of the memory device is unlocked using the authenticated command.

Upon being recovered, the PSID 221 can be printed on a medium 223 attached to the memory device 230, which can be attached to the memory device 230. The medium 223 attached to the memory device 230 can be an encrypted manufacturing data image, and the PSID can be securely retrieved from the manufacturing data image to revert the memory device 230 to its original state. After being printed on the medium 223 attached to the memory device 230, the PSID 221 can be deleted from the secure database 228. The PSID 221 can be deleted from the secure database by erasing the PSID 221 from all storage locations within the secure database 228.

FIG. 3 is an example of a lookup table 316 for generating a memory physical presence security identification (PSID) in accordance with some embodiments of the present disclosure. As shown in FIG. 3, the lookup table 316 can be analogous to lookup table 116 and 216 illustrated in FIG. 1 and FIG. 2 respectively.

As previously described herein, the PSID can be generated using a statistically random number generator, which can randomly generate numbers that correspond to symbols (e.g., letters and/or numbers) included in lookup table 316.

For example, the lookup table 316 can include one or more storage locations that can store one or more data values. The data values can include ASCII codes 354-1, . . . , 354-N, each corresponding to a different random number value 352-1, . . . , 352-N used to generate statistically random symbols for the PSID.

For instance, in the example illustrated in FIG. 3, each number and letter of the alphabet is designated as an ASCII code 354, which can be assigned a random number 356 between 1 and 32. For instance, the number 1 is designated an ASCII code 354 corresponding to the decimal value 351 of "49", the symbol 353 of "1", the description 355 of "number one", and the random number 356 of "1"; the letter A is designated an ASCII code 354 corresponding to the decimal value 351 of "65", the symbol 353 of "A", the description 355 of "Capital A", and the random number 356 of "10", etc. Accordingly, if the random number generator were to generate the number 1, the symbol 1 would be used in the PSID; if the random number generator were to generate the number 10, the symbol A would be used in the PSID, etc. As an example, the random number generator can generate 32 random numbers, such that the PSID includes 32 symbols.

Figure 4:
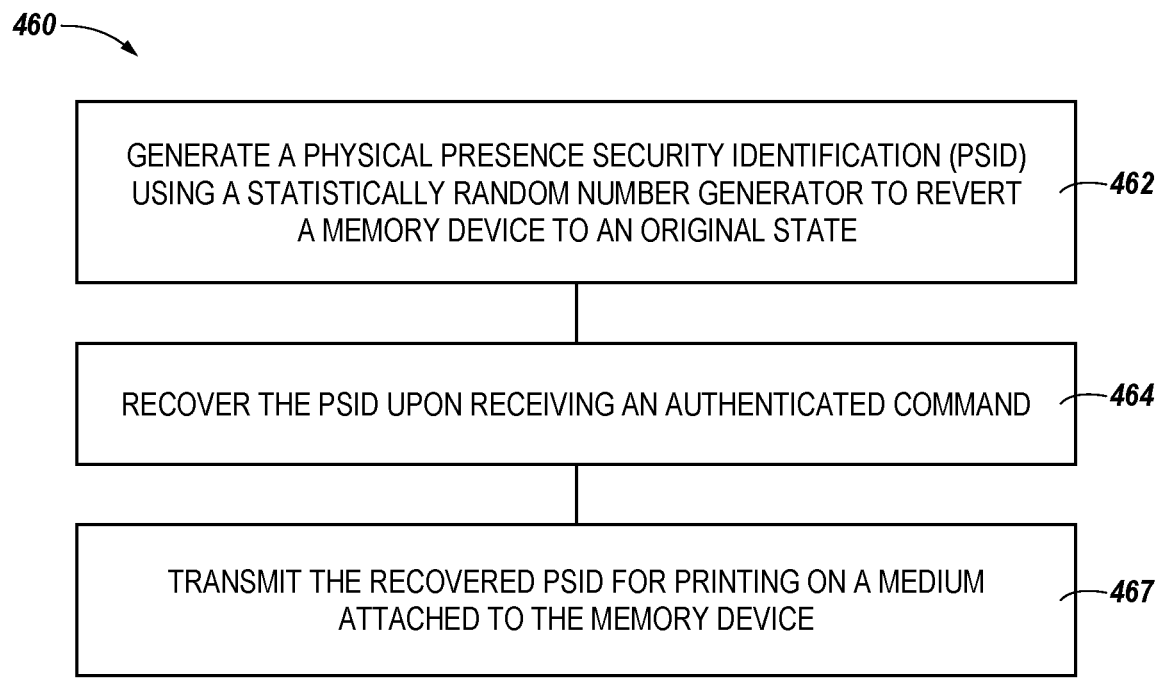
FIG. 4 is a flow diagram of an example method for a memory physical presence security identification (PSID) in accordance with some embodiments of the present disclosure.

FIG. 4 is a flow diagram of an example method 460 for a memory physical presence security identification (PSID) in accordance with some embodiments of the present disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by and/or utilizing the PSID generator component 113 of FIG. 1 and/or the lookup table 116 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 462, the processing device generates a physical presence security identification (PSID) using a statistically random number generator to revert a memory device (e.g., memory device 130 of FIG. 1) to an original state. For instance, the processing device (e.g., the processor 117 illustrated in FIG. 1, herein) can generate the PSID for the memory device using a statistically random number generator and a lookup table, and subsequently use that PSID to revert the memory device to an original state, as previously described herein.

At operation 464, the processing device recovers the PSID upon receiving an authenticated command. For example, the authenticated command can be inputted to enable access to the PSID, and can provide for automatic validation of the PSID, as previously described herein.

At operation 467, the processing device transmits the recovered PSID for printing on a medium attached to the memory device. For example, the processing device can transmit the PSID for printing on a medium attached to the medium device (e.g., memory device 130 of FIG. 1), as previously described herein.

Figure 5:
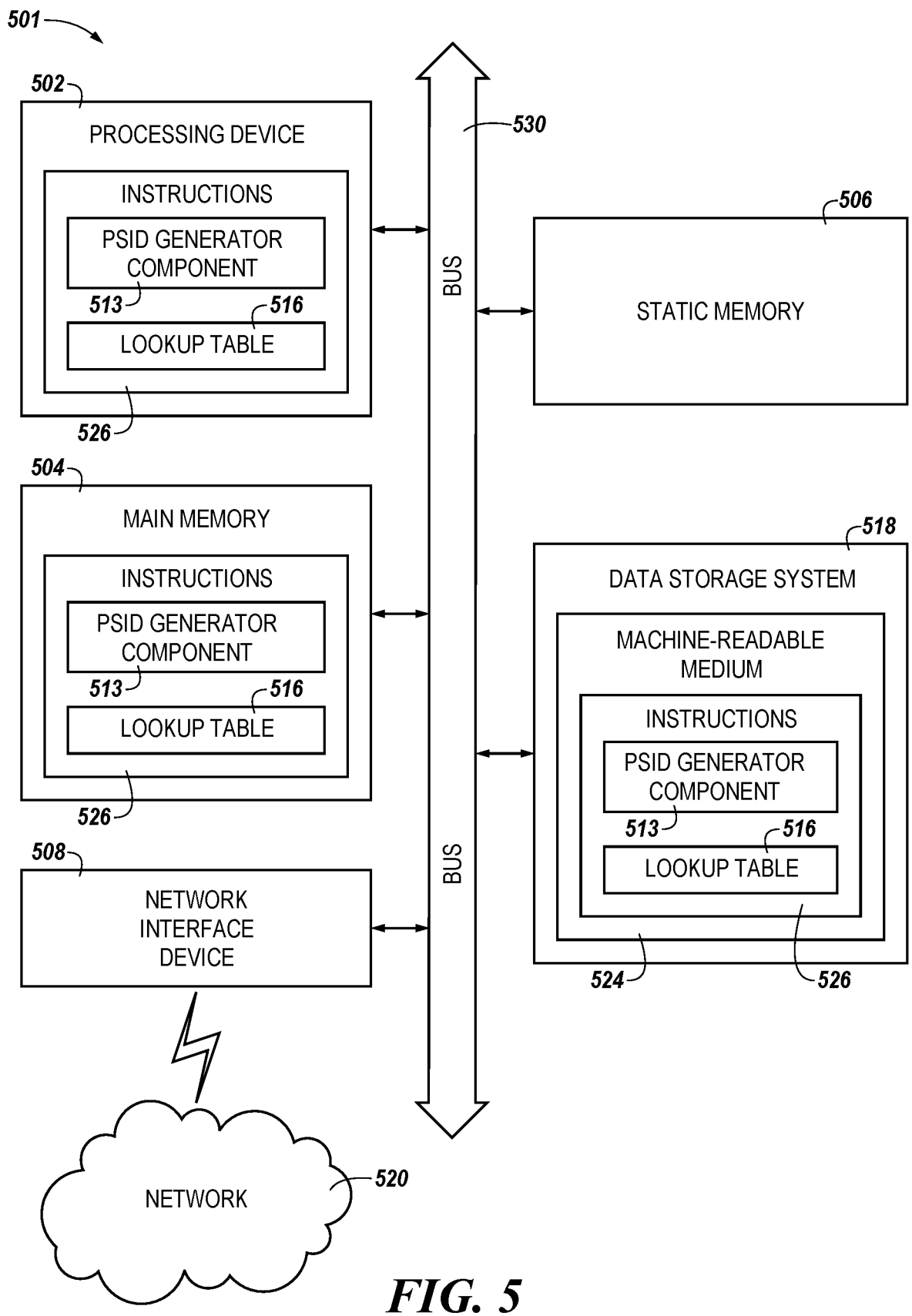
FIG. 5 is a block diagram of an example computer system in which embodiments of the present disclosure can operate.

FIG. 5 is a block diagram of an example computer system 501 in which embodiments of the present disclosure can operate. For example, FIG. 5 illustrates an example machine of a computer system 501 within which a set of instructions, for causing the machine to perform any one or more of the methodologies discussed herein, can be executed. In some embodiments, the computer system 501 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the PSID generator component 113 and the lookup table 116 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 501 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 can execute instructions 526 for performing the operations and steps discussed herein. The computer system 501 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 501, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to PSID generator component 513 and the lookup table 516. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
    a memory component; and
    a processing device, operatively coupled with the memory component, to:
       generate a physical presence security identification (PSID) for the memory component using a statistically random number generator based on a lookup table indexed using American Standard Code for Information Interchange (ASCII) codes; and
       securely retrieve the PSID and revert the memory component to an original factory state using the PSID.

2. The system of claim 1, wherein:
    the system further comprises a host interface; and
    the processing device is to revert the memory component to the original factory state without transmitting the PSID over the host interface.

3. The system of claim 1, wherein the processing device is to store the PSID in a secure storage format in the memory component.

4. The system of claim 3, wherein the processing device is to store the PSID in the secure storage format using encryption.

5. The system of claim 3, wherein the processing device is to store the PSID in the secure storage format using a cryptographic hash or cryptographic key.

6. The system of claim 1, wherein the processing device is to transmit the PSID for printing on a medium attached to the system.

7. The system of claim 1, wherein the statistically random number generator is a Deterministic Random Bit Generator (DRBG).

8. A method, comprising:
    generating a physical presence security identification (PSID) using a statistically random number generator based on a lookup table indexed using American Standard Code for Information Interchange (ASCII) codes to revert a memory device to an original factory state;
    recovering the PSID upon receiving an authenticated command; and
    transmitting the recovered PSID for printing on a medium physically attached to the memory device.

9. The method of claim 8, further comprising recovering the PSID only when a drive of the memory device is unlocked using the authenticated command.

10. The method of claim 8, further comprising generating the PSID such that it cannot be derived from a serial number of the memory device.

11. The method of claim 8, further comprising storing the PSID as a keyword compressed and embedded on a secure database.

12. The method of claim 11, further comprising storing the PSID in the secure database until the PSID is printed on the medium physically attached to the memory device.

13. The method of claim 11, further comprising recovering the PSID from the secure database using a restricted command.

14. A non-transitory computer-readable storage medium comprising instructions that, when executed by a processing device, cause the processing device to:
    generate a physical presence security identification (PSID) for a memory device using a statistically random number generator based on a lookup table indexed using American Standard Code for Information Interchange (ASCII) codes;
    securely retrieve the PSID from the memory device; and
    print the PSID on a medium physically attached to the memory device.

15. The non-transitory computer-readable storage medium of claim 14, wherein the instructions, when executed, further cause the processor to retrieve the PSID from an encrypted manufacturing data image.

16. The non-transitory computer-readable storage medium of claim 14, wherein the instructions, when executed, further cause the processor to enable access to the PSID using an authenticated command.

17. The non-transitory computer-readable storage medium of claim 14, wherein the PSID is deleted from a secure database by erasing the PSID from all storage locations in the secure database.

18. The non-transitory computer-readable storage medium of claim 14, wherein the PSID is stored as a Product Security Parameter (PSP) on the memory device.

19. The non-transitory computer-readable storage medium of claim 14, wherein the PSID is used to revert security settings on the memory device back to its default security settings.

* * * * *